United States Patent
Jason et al.

(10) Patent No.: US 11,511,140 B2
(45) Date of Patent: Nov. 29, 2022

(54) PRESSURIZED GAS MANIFOLD AND SYSTEM

(71) Applicant: Rockwell Collins, Inc., Cedar Rapids, IA (US)

(72) Inventors: Daniel J. Jason, Shawnee, KS (US); George J. Papanastasiou, Kirkland, WA (US); Maurice E. Zimmerman, Everett, WA (US); Kyle Roth, Winston Salem, NC (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 952 days.

(21) Appl. No.: 16/280,836

(22) Filed: Feb. 20, 2019

(65) Prior Publication Data
US 2021/0069532 A1 Mar. 11, 2021

(51) Int. Cl.
*A62B 7/02* (2006.01)
*A62B 7/14* (2006.01)
(Continued)

(52) U.S. Cl.
CPC .................. *A62B 7/02* (2013.01); *A62B 7/14* (2013.01); *A62B 9/04* (2013.01); *A62B 25/005* (2013.01);
(Continued)

(58) Field of Classification Search
CPC .... A62B 7/02; A62B 7/00; A62B 7/06; A62B 7/08; A62B 7/14; A62B 9/04; A62B 9/02;
(Continued)

(56) References Cited

U.S. PATENT DOCUMENTS

| 6,260,571 B1 * | 7/2001 | Lind ....................... F16K 1/302 |
| | | 137/580 |
| 2005/0072463 A1 * | 4/2005 | Sundholm ............ A62C 35/023 |
| | | 137/68.3 |

(Continued)

FOREIGN PATENT DOCUMENTS

| CH | 667211 A5 * | 9/1988 |
| DE | 2635076 A1 | 2/1978 |
| WO | 2011009079 A1 | 1/2011 |

OTHER PUBLICATIONS

English Machine Translation of CH 667211 A5 provided by Espacenet (Year: 1988).*

(Continued)

*Primary Examiner* — Joseph D. Boecker
*Assistant Examiner* — Brian T Khong
(74) *Attorney, Agent, or Firm* — Suiter Swantz pc llo

(57) ABSTRACT

A system may include a manifold. The manifold may include a body and a rupture disc. The body may include first connector connected to a pressurized source, a second connector, and a third connector. The body may include hollow pathway network including a first path portion extending from the pressurized source to a pathway junction, a second path portion extending from the pathway junction to the second connector, and a third path portion extending from the pathway junction to the third connector. The first path portion may include a bend. The rupture disc may be positioned between the bend and the pathway junction. When the rupture disc is in an unruptured state, the rupture disc may seal the first path portion from the other path portions. When the rupture disc is in a ruptured state, the rupture disc may allow a flow from the pressurized source to the third connector.

19 Claims, 11 Drawing Sheets

(51) Int. Cl.
*A62B 9/04* (2006.01)
*A62B 25/00* (2006.01)
*B64D 11/06* (2006.01)

(52) U.S. Cl.
CPC .... *B64D 11/0632* (2014.12); *B64D 2231/025* (2013.01)

(58) Field of Classification Search
CPC ......... A62B 9/022; A62B 9/025; A62B 9/027; A62B 25/005; B64D 11/0632; B64D 11/0629; B64D 2231/025; A62C 37/36; F16K 17/14; F16K 17/16; F16K 17/40; F16K 17/403
USPC .............................................. 137/68.19–68.3
See application file for complete search history.

(56) References Cited

U.S. PATENT DOCUMENTS

2012/0111871 A1* 5/2012 Sitabkhan ................ A62B 7/14
220/562
2014/0137869 A1* 5/2014 Schrader .................. A62B 7/14
128/205.21

OTHER PUBLICATIONS

"Aerox® Aviation Oxygen Systems to Provide Free Oxygen Refresher at EAA AirVenture 2015", Engines & Components, Shaw Aerox® Oxygen Systems, Inc., Jul. 8, 2015, printed Dec. 12, 2018.
Office Action in European Application No. 20158287.1 dated Jul. 6, 2022, 7 pages.

* cited by examiner

PRESSURIZED GAS MANIFOLD AND SYSTEM

BACKGROUND

Emergency oxygen systems are required for commercial aircraft. Emergency oxygen systems typically include existing oxygen manifolds mounted on top of an oxygen cylinder. Existing oxygen manifolds have a rupture disc that directly abuts an oxygen cylinder outlet. When the rupture disc is intact, a gas pathway from the rupture disc through the oxygen manifold is unpressurized and extends perpendicular to the rupture disc and a plane traversing an opening of the oxygen cylinder outlet. Emergency oxygen systems including existing oxygen manifolds take up a lot of space in aircraft due to the existing oxygen manifold and an initiator extending straight off the top of the oxygen cylinder.

SUMMARY

In one aspect, embodiments of the inventive concepts disclosed herein are directed to a system including a pressurized gas manifold. The pressurized gas manifold may include a body and a rupture disc. The body may include a connector shaped to accommodate a pressurized gas container outlet, a manifold insert connector shaped to accommodate a portion of a manifold insert, and a regulator connector shaped to accommodate a regulator. The body may include a hollow pathway network. The hollow pathway network may include a) a first path portion extending from a first opening positioned to receive gas from the pressurized gas container outlet and extending to a pathway junction, the first path portion including a bend, b) a second path portion extending from the pathway junction to a second opening positioned in the manifold insert connector, and c) a third path portion extending from the pathway junction to a third opening positioned in the regulator connector. The rupture disc may be positioned between the bend of the first path portion and the pathway junction. The rupture disc may be oriented perpendicular to the second path portion. When the rupture disc is in an unruptured state, the rupture disc may be configured to seal the first path portion from the second path portion and the third path portion. When the rupture disc is in a ruptured state, the rupture disc may be configured to allow a flow of gas from the pressurized gas container outlet to the regulator.

In a further aspect, embodiments of the inventive concepts disclosed herein are directed to a system including a manifold. The manifold may include a body and a rupture disc. The body may include a first connector configured to connect to a pressurized source, a second connector, and a third connector. The body may include a hollow pathway network including: a) a first path portion extending from a first opening positioned to receive matter from the pressurized source and extending to a pathway junction, the first path portion including a bend, b) a second path portion extending from the pathway junction to a second opening positioned in the second connector, and c) a third path portion extending from the pathway junction to a third opening positioned in the third connector. The rupture disc may be positioned between the bend of the first path portion and the pathway junction. The rupture disc may be oriented perpendicular to the second path portion. When the rupture disc is in an unruptured state, the rupture disc may be configured to seal the first path portion from the second path portion and the third path portion. When the rupture disc is in a ruptured state, the rupture disc may be configured to allow a flow of matter from the pressurized source through the third connector.

In a further aspect, embodiments of the inventive concepts disclosed herein are directed to an aircraft system including a passenger service unit (PSU). The PSU may include a regulator, a manifold insert, an initiator connected to the manifold insert, a pressurized oxygen container including a pressurized oxygen container outlet, and a pressurized gas manifold. The pressurized gas manifold may include a body and a rupture disc. The body may include a connector connected to the pressurized oxygen container outlet, a manifold insert connector connected to the manifold insert, a regulator connector connected to the regulator. The body may include a hollow pathway network including: a) a first path portion extending from a first opening positioned to receive oxygen from the pressurized oxygen container outlet and extending to a pathway junction, the first path portion including a bend, b) a second path portion extending from the pathway junction to a second opening positioned in the manifold insert connector, and c) a third path portion extending from the pathway junction to a third opening positioned in the regulator connector. The rupture disc may be positioned between the bend of the first path portion and the pathway junction. The rupture disc may be oriented perpendicular to the second path portion. When the rupture disc is in an unruptured state, the rupture disc may be configured to seal the first path portion from the second path portion and the third path portion. When the rupture disc is in a ruptured state, the rupture disc may be configured to allow a flow of oxygen from the pressurized oxygen container outlet to the regulator. The initiator may be configured to initiate a pyrotechnic charge to cause a lance to rupture the rupture disc.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
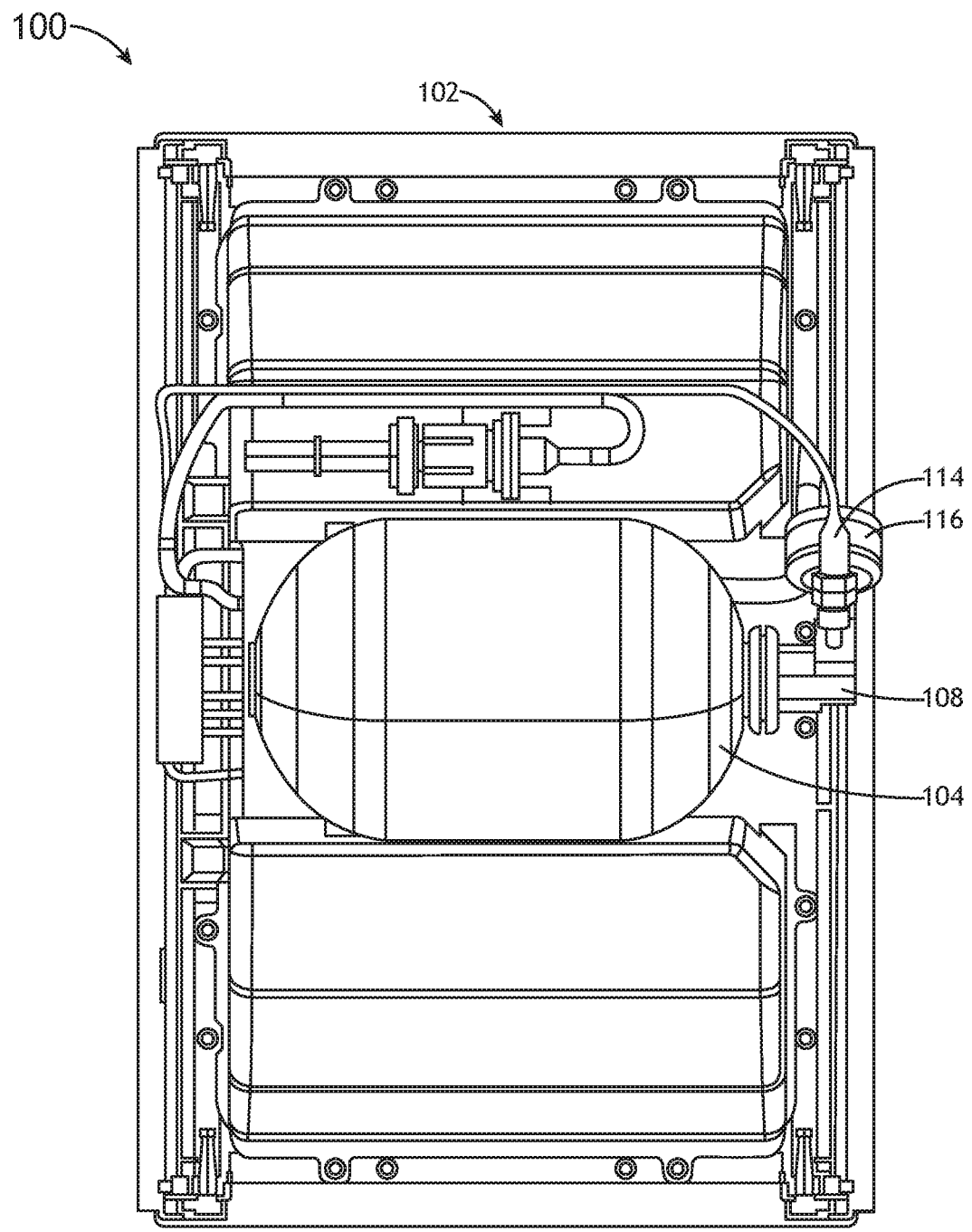
FIG. 1 is a top perspective view of an exemplary embodiment of a system including a PSU including a pressurized oxygen container and a manifold assembly according to the inventive concepts disclosed herein.
Figure 2:
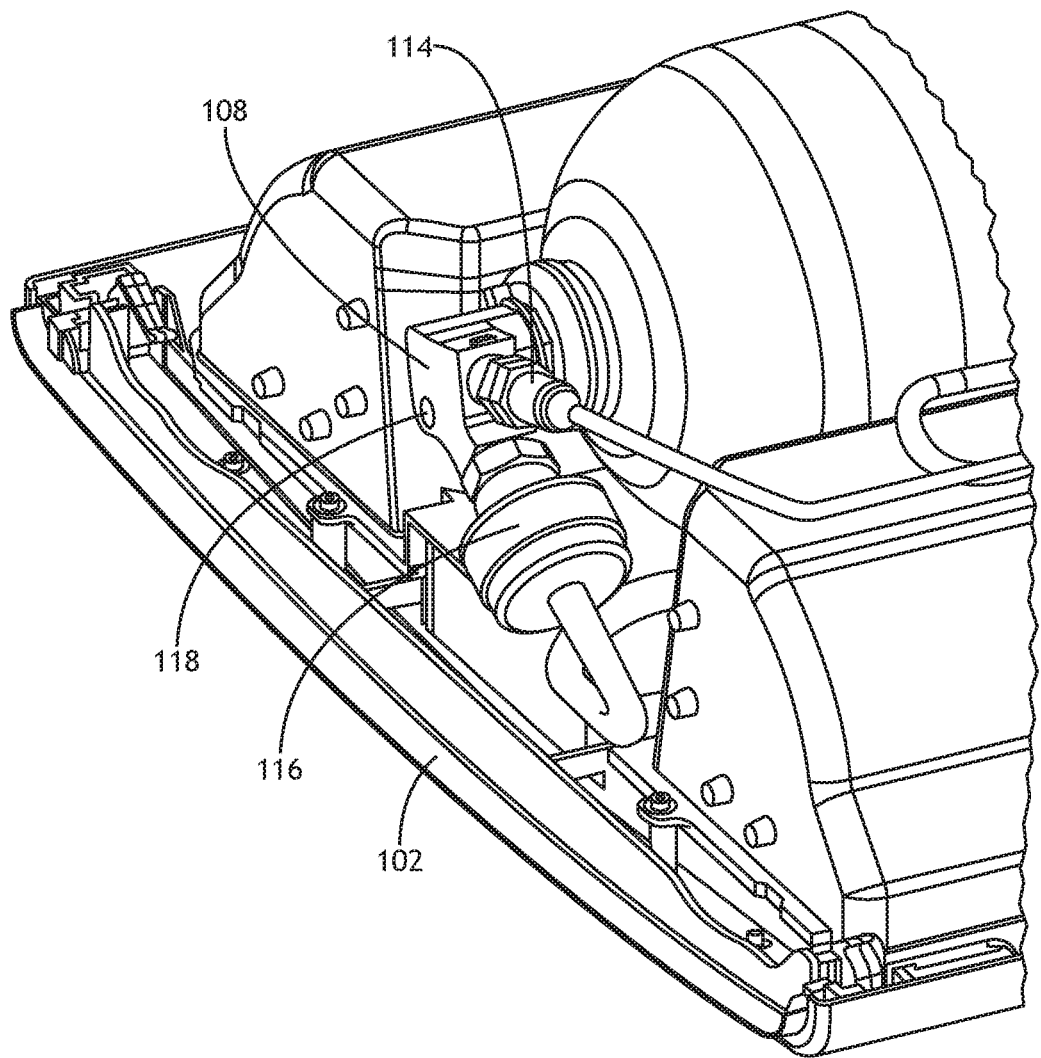
FIG. 2 is a side perspective view of the system of FIG. 1 according to the inventive concepts disclosed herein.
Figure 3:
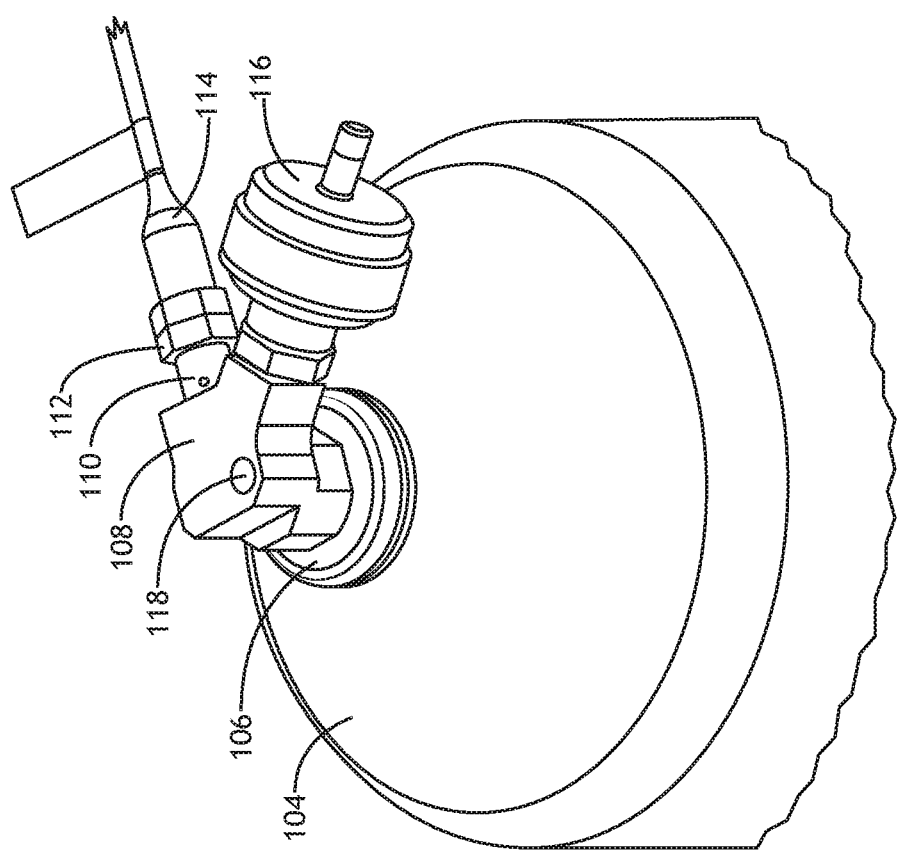
FIG. 3 is a partial perspective view of the pressurized oxygen container and the manifold assembly of FIG. 1 according to the inventive concepts disclosed herein.
Figure 4:
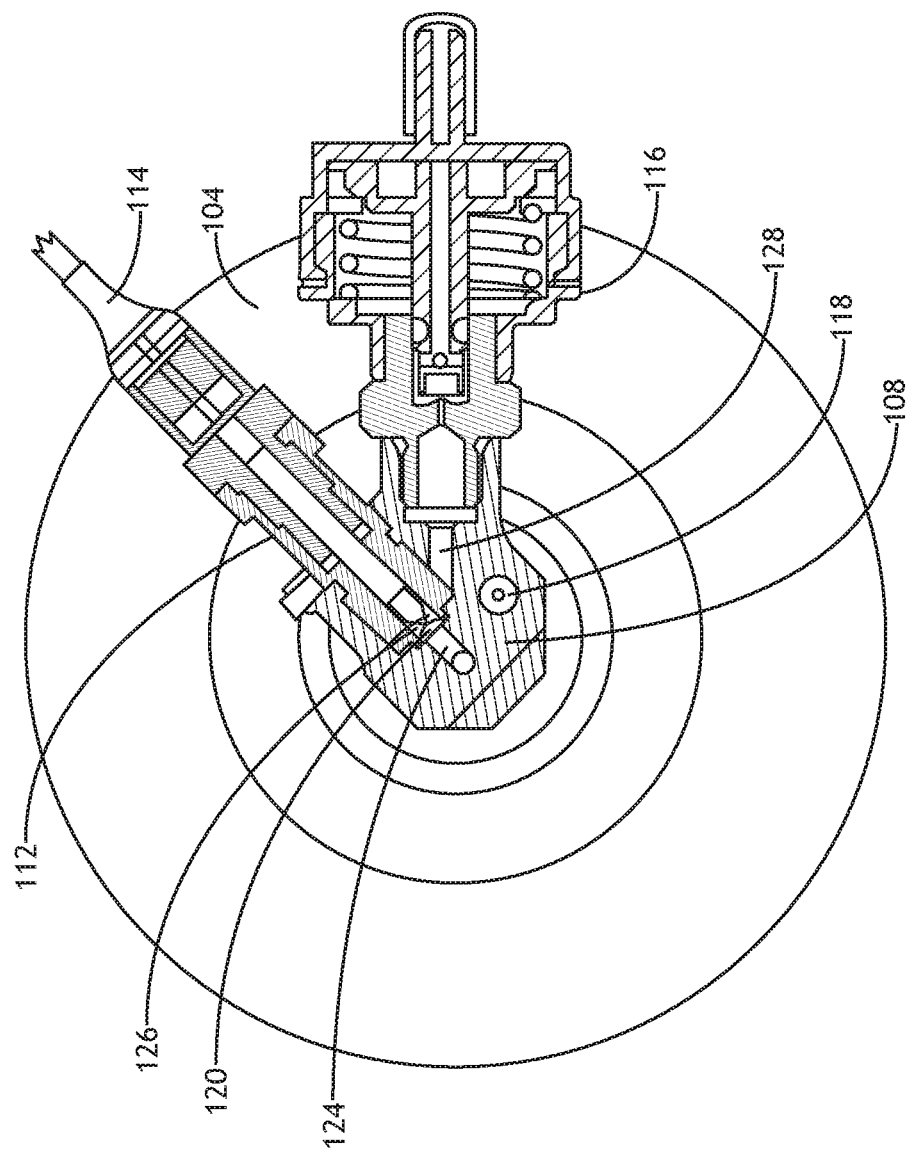
FIG. 4 is a partial cross-sectional view of the pressurized oxygen container and the manifold assembly of FIG. 1 according to the inventive concepts disclosed herein.
Figure 5:
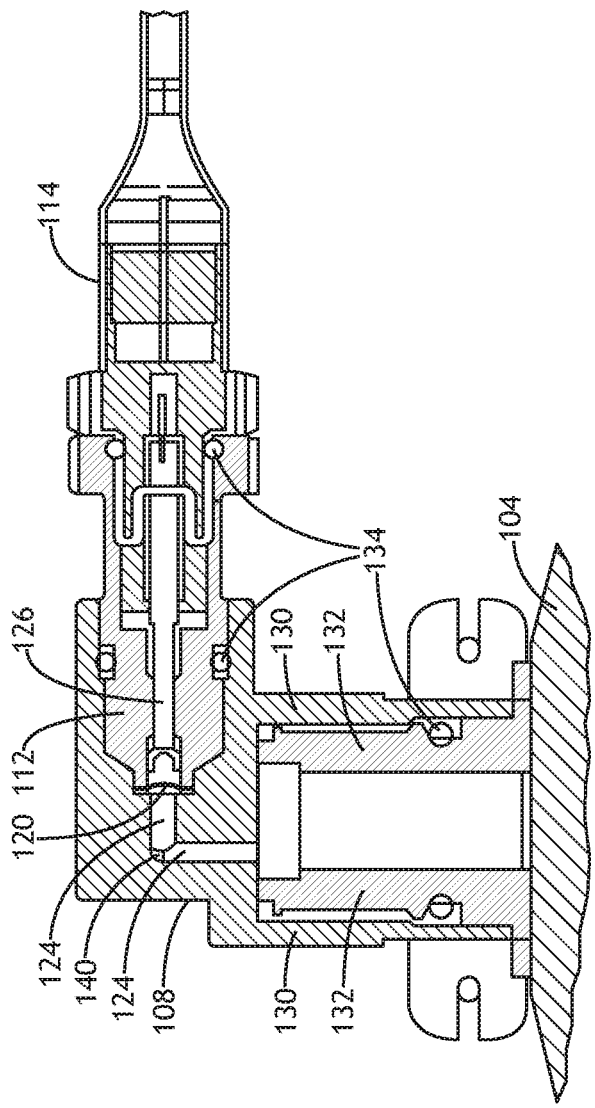
FIG. 5 is a partial cross-sectional view of the pressurized oxygen container and the manifold assembly of FIG. 1 according to the inventive concepts disclosed herein.
Figure 6:
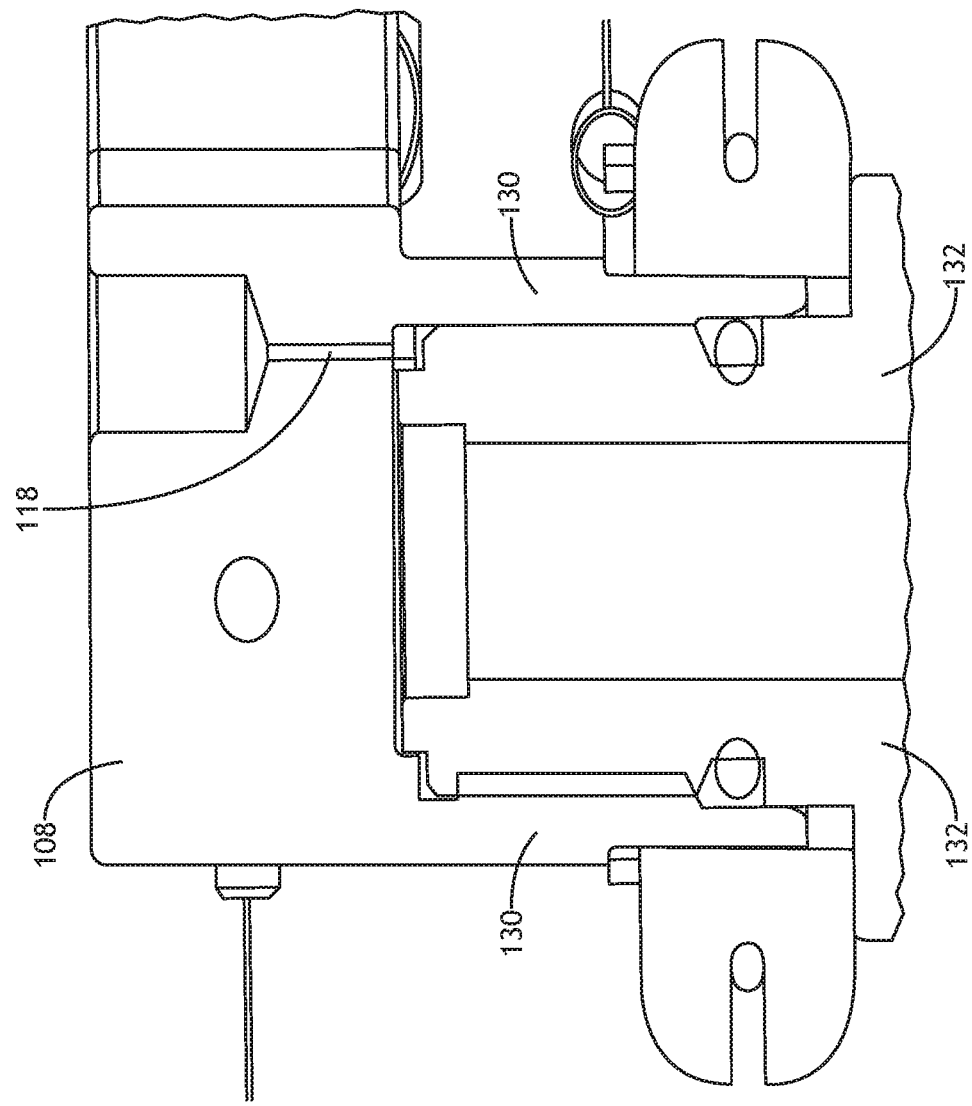
FIG. 6 is a partial cross-sectional view of the pressurized oxygen container and the manifold assembly of FIG. 1 according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a manifold (e.g., a pressurized gas manifold) and a system.

Embodiments may be configured to compactly contain and a discharge compressed matter (e.g., a compressed gas and/or liquid) via a manifold fitted to a pressurized source (e.g., a pressurized gas container, such as a pressurized oxygen container). Embodiments may include a system that may include a manifold assembly and the high-pressure source. The manifold assembly may include the manifold, a manifold insert, a rupture disc, a regulator, and various seals. The manifold may be attached to the pressurized source through a leak-free interface. The manifold may include a high-pressure side and a low-pressure side, which are separated by a rupture disc. The rupture disc may be seated near the manifold insert to also be leak-free. The manifold may be configured to allow for an outlet port (e.g., an outlet port for a regulator) to be implemented at any angle relative to an outlet port of the high-pressure source (e.g., a pressurized gas container outlet, such as a pressurized oxygen container outlet).

The pressurized gas container and manifold assembly may be mounted in a vehicle (e.g., an aircraft), such as in a PSU or in a vicinity of a galley or lavatory installation. For example, the pressurized gas container may serve between one and five users in each seating group or location.

The manifold may incorporate a rupture disc and provide a means for filling the pressurized gas container with a gas (e.g., a breathing gaseous mixture include oxygen) via a dedicated fill port. The manifold may be a single use device that may be connected to a pyrotechnic initiator and a pressure regulator. The manifold may include a plurality of seals. For example, with the exception of the rupture disc and a pressurized gas container to manifold seal, some or all of the seals of the manifold interfaces may be silicon O-rings. In the event of an overpressure discharge from the rupture disc, the high-pressure gas may be directed through a discharge port in the manifold, manifold insert, or initiator. For example, the initiator may include a discharge indicator configured to provide a visual indication of an overpressure event. The discharge indicator may be fitted over one or more (e.g., one, two, three, or four) discharge ports. The discharge indicator(s) may be implemented as a frangible vinyl label(s) with an adhesive backing(s) located over the discharge port(s) to provide indication.

The manifold insert may be connected to the manifold and may be configured to seal the rupture disc prior to rupture and to seal around an activation lance after rupture of the rupture disc per design activation and leakage standards.

In some embodiments, the manifold assembly may have a unique geometry and sealing surfaces with application of torque to create a 20-year guaranteed service life for the product with a leak rate of less than $2.25 \times 10^{-9}$ cubic centimeters (cc)/second. After activation the sealing properties of the initiator to manifold may provide less than 9 cc per minute of flow.

A geometry of the manifold assembly may be configured so that the manifold assembly can fit into a compact space, such as inside of a PSU. A regulator hose and initiator wire may be positioned in any relative direction provided they are downstream of the rupture disc. Such flexibility in design allows the initiator lead wire and regulator hose to be directed in a most efficient manner to reduce length, limit hose and wire bending, and simplify installation for a technician.

The manifold assembly includes a rupture disc seal that is separated from the fill port. This allows the rupture disc seal of the manifold to be leak tested prior to installation of the manifold assembly and filling of the pressurized gas container. This reduces repair repetition time if a leak is found within the rupture disc seal.

As compared to existing manifolds, embodiments may include a rupture disc having a diameter smaller than a diameter of the pressurized gas container outlet to allow for a decreased size in the manifold while allowing for same effective burst area and rupture pressures.

Embodiments do not require complex machining processes and allow for ease of assembly to reduce cost to produce parts and reduce manufacturing time. For example, embodiments may eliminate the need for a specialized spacing tool to fill around a rupture disc as required for existing manifold assemblies.

The geometry of the manifold insert may allow the manifold insert to compress edges of the rupture disc against a sealing surface of the manifold such that the rupture disc seal can hold high-pressure gas for 20 years of service life.

Additionally, based on the initiator to manifold geometry, embodiments allow the initial impact from the lance to puncture the rupture disc and then seal on side walls to prevent leakage of high-pressure gas around the lance.

Referring now to FIGS. 1-13, an exemplary embodiment of a system including a manifold assembly according to the inventive concepts disclosed herein is depicted. The system may be any suitable system. For example, the system may be a vehicular system (e.g., an aircraft system) of a vehicle (e.g., an aircraft 100). For example, the system may be implemented as or include a PSU 102 of the aircraft 100. For example, the system may be configured to provide oxygen to passengers of the aircraft 100. The system may include a regulator 116 (e.g., a pressure regulator), a manifold insert 112, an initiator 114 connected to the manifold insert 112, a pressurized source (e.g., a pressurized gas container (e.g., a pressurized oxygen container 104)), and a manifold 108 (e.g., a pressurized gas manifold). The regulator 116, the manifold insert 112, the initiator 114, the pressurized oxygen container 104, and the manifold 108 may be installed in the aircraft 100, such as in the PSU 102, in a lavatory, or in a galley.

The pressurized source may be any suitable pressurized source of liquid and/or gas. For example, the pressurized source may be the pressurized oxygen container 104. The pressurized oxygen container 104 may contain pressurized oxygen. The pressurized oxygen container 104 may include a grommet 106 and a pressurized oxygen container outlet 132 where the pressurized oxygen container 104 can be filled or discharged.

The manifold 108 may include a body. The body may be composed of any suitable material, such as a copper alloy. The body of the manifold 108 may include a first connector (e.g., a female connector 130) connected to the pressurized source (e.g., the pressurized oxygen container outlet 132). The body may further include a second connector (e.g., a female manifold insert connector 136) connected to the manifold insert 112. The body may further include a third connector (e.g., a regulator connector 144) connected to the regulator 116. While the connectors 130, 136, and 144 are exemplarily depicted and described as female connectors, in some embodiments, the connectors 130, 136, and 144 may be implemented as male connectors, female connectors, other types of connectors, or some combination thereof.

The body of the manifold 108 may further include a hollow pathway network implemented within the body. The hollow pathway network may include a first path portion 124, a second path portion 126, and a third path portion 128. The first path portion 124 may extend from a first opening positioned to receive oxygen from the pressurized oxygen container outlet 132 and extend to a pathway junction where the first path portion 124, the second path portion 126, and the third path portion 128 converge. The first path portion 124 may include a bend 140. The bend 140 may have any suitable angle (e.g., between 10 and 170 degrees, between 30 and 150 degrees, between 45 and 135 degrees, between 60 and 120 degrees, or approximately 90 degrees (+/−10 degrees)). The second path portion 126 may extend from the pathway junction to a second opening positioned in the female manifold insert connector 136. The third path portion 128 may extend from the pathway junction to a third opening positioned in the regulator connector 144. In some embodiments, the second path portion 126 and the third path portion 128 are coplanar. For example, the second path portion 126 and the third path portion 128 may be oriented in plane at any angle relative to a section of the first path portion 124 between the first opening and the bend 140. For example, the second path portion 126 and the third path portion 128 may be oriented approximately orthogonal to a section of the first path portion 124 between the first opening and the bend 140. The second path portion 126 may be offset by any suitable angle from the third path portion 128. For example, the second path portion 126 may be offset by between 20 and 160 degrees (e.g., approximately 45 degrees (+/−10 degrees)) from the third path portion 128. As such, each of the female connector 130, the female manifold insert connector 136, and the regulator connector 144 may be implemented with any angular orientation relative to the other connectors.

The body of the manifold 108 may further include a sealable fill port 118 with a pathway through the manifold 108 such that the pressurized oxygen container 104 may be filled. The fill port 118 may be separated from the hollow pathway network of the manifold 108.

Figure 7:
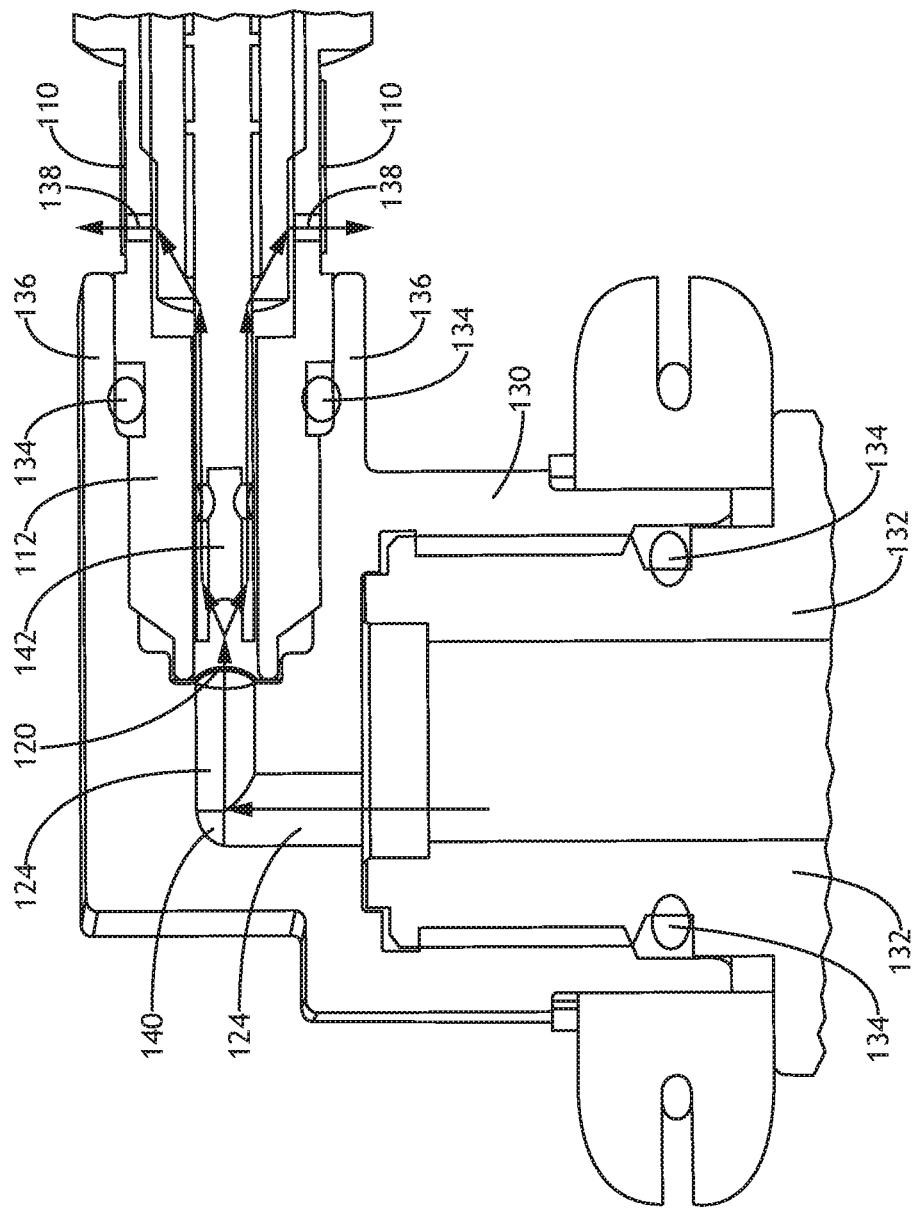
FIG. 7 is a partial cross-sectional view of the pressurized oxygen container and the manifold assembly of FIG. 1 according to the inventive concepts disclosed herein.

A rupture disc 120 may be seated in the manifold 108. The rupture disc 120 may be composed of any suitable material, such as nickel, a nickel alloy, copper, and/or a copper alloy. The rupture disc 120 may be positioned between the bend 140 of the first path portion 124 and the pathway junction. The rupture disc 120 may be oriented perpendicular to a longitudinal direction of the second path portion 126 such that a lance 142 can move through the second path portion 126 to pierce the rupture disc 120 when initiated. When the rupture disc 120 is in an unruptured state, the rupture disc 120 may be configured to seal the first path portion 124 from the second path portion 126 and the third path portion 128. When the rupture disc 120 is in a ruptured state (e.g., pierced by the lance 142), the rupture disc 120 may be configured to allow a flow of oxygen from the pressurized oxygen container outlet 132 to the regulator 116. A diameter of the rupture disc 120 may be less than a diameter of the pressurized oxygen container outlet 132. As shown in FIG. 7, in the event of an overpressure discharge from the rupture disc 120, the high-pressure gas may be directed through at least one discharge port 138 of the manifold insert 112. For example, the manifold insert 112 may include at least one discharge indicator 110 configured to provide a visual indication of an overpressure event. The at least one discharge indicator 110 may be fitted over one or more (e.g., one, two, three, or four) discharge ports 138. The discharge indicator(s) 110 may be implemented as a frangible vinyl label(s) with an adhesive backing(s) located over the discharge port(s) to provide indication.

The manifold insert 112 may be connected to the female manifold insert connector 136 and the initiator 114. The manifold insert 112 may at least partially longitudinally reside within the second path portion 126. In an unruptured state, the manifold insert 112 may be configured to compressibly seal the rupture disc 120 against the body of the manifold 108 to maintain a pressure differential from the pressurized first path portion 124 and the unpressurized second and third path portions 126, 128. At least one seal 134 (e.g., a silicon O-ring) may be positioned between the manifold 108 and the manifold insert 112 to prevent leakage of gas around the manifold insert 112 when the rupture disc 120 is in a ruptured state.

Figure 8:
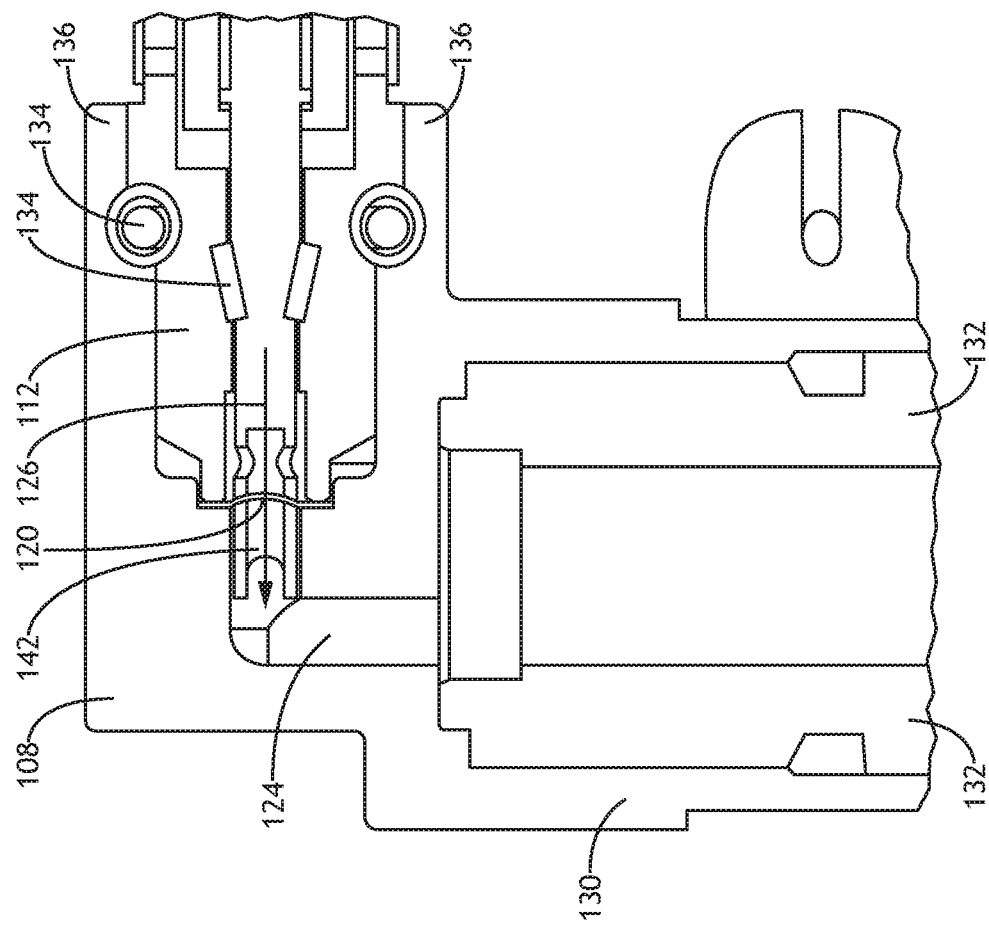
FIG. 8 is a partial cross-sectional view of the pressurized oxygen container and the manifold assembly of FIG. 1 according to the inventive concepts disclosed herein.
Figure 9:
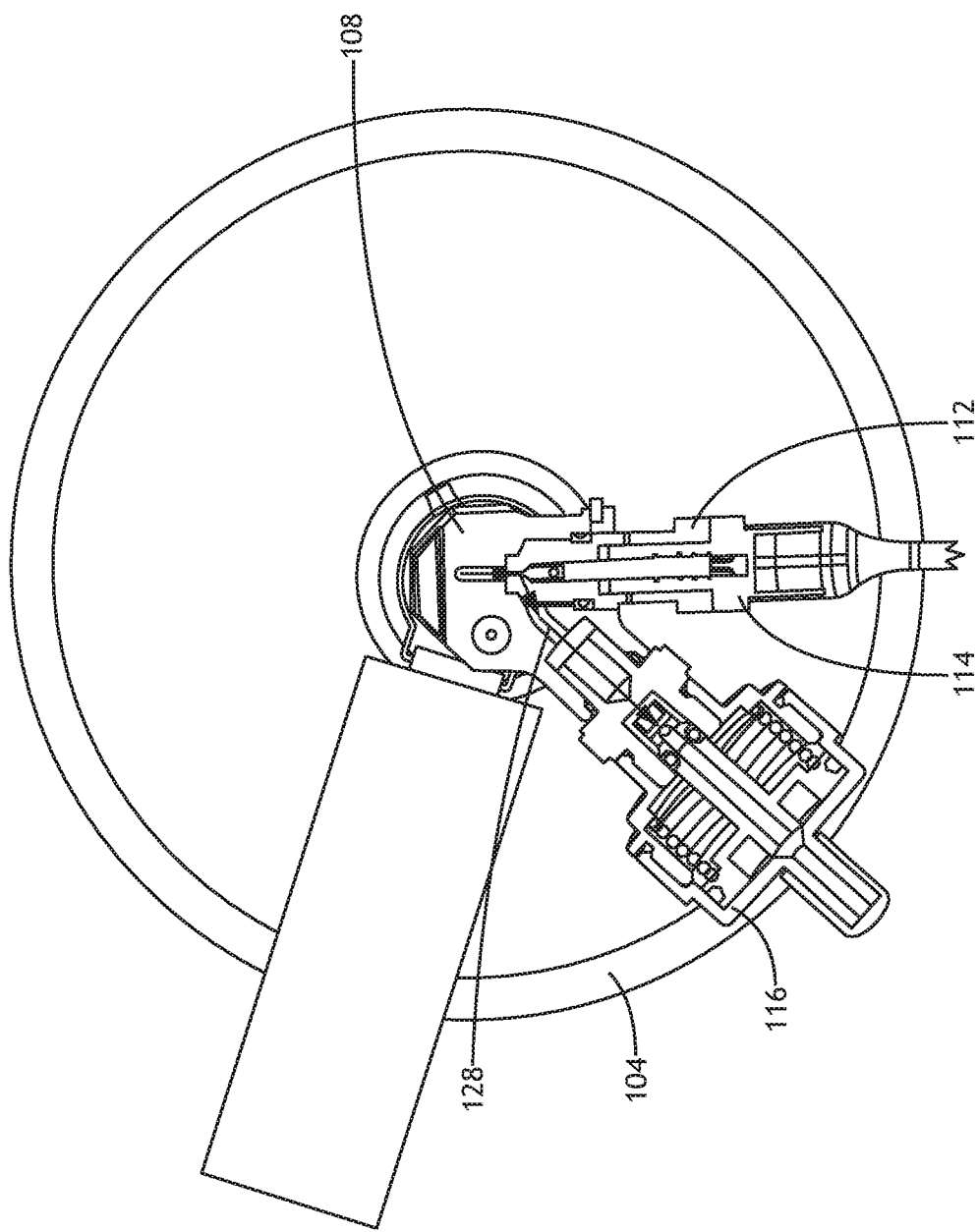
FIG. 9 is a partial cross-sectional view of the pressurized oxygen container and the manifold assembly of FIG. 1 according to the inventive concepts disclosed herein.
Figure 10:
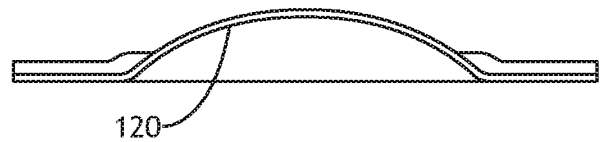
FIG. 10 is a partial cross-sectional view of a rupture disc of the manifold assembly of FIG. 1 according to the inventive concepts disclosed herein.
Figure 11:
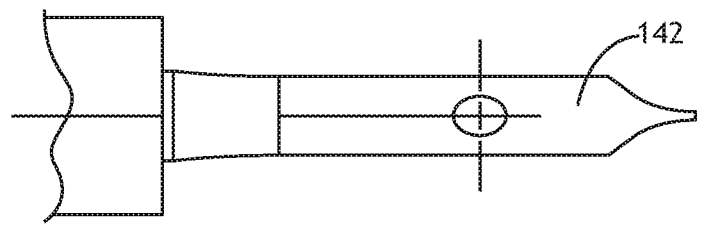
FIG. 11 is a partial view of a lance of the manifold assembly of FIG. 1 according to the inventive concepts disclosed herein.
Figure 12:
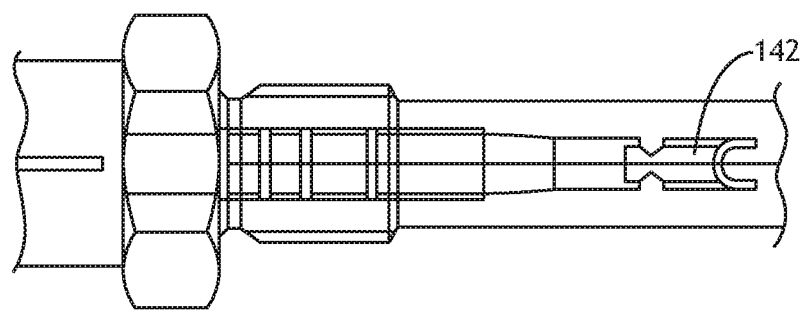
FIG. 12 is a partial view of the lance of FIG. 11 according to the inventive concepts disclosed herein.
Figure 13:
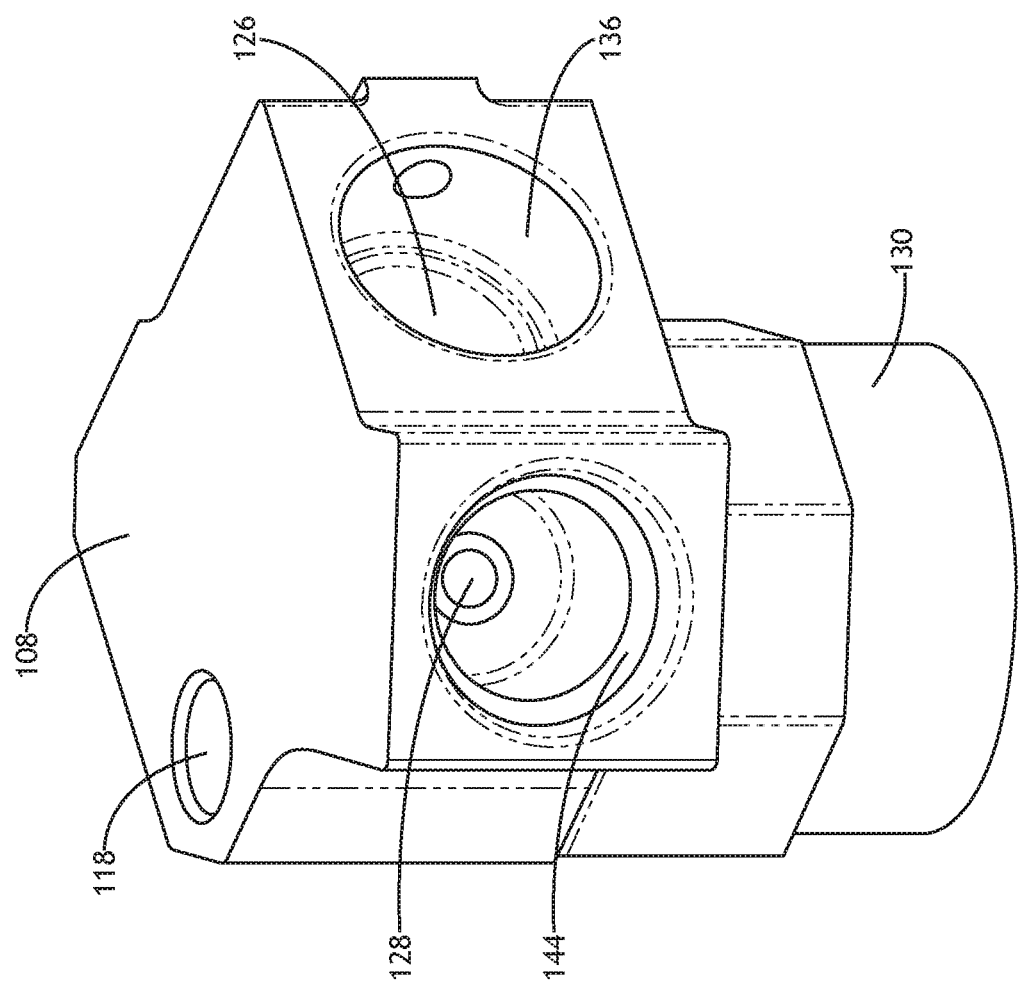
FIG. 13 is a perspective view of the manifold of FIG. 1 according to the inventive concepts disclosed herein.

The initiator 114 may be connected to the manifold insert 112. As shown in FIG. 9, the initiator 114 may be electrically triggered to initiate a pyrotechnic charge to cause the lance 142 to pierce and rupture the rupture disc 120, thus allowing a flow of oxygen from the pressurized oxygen container outlet 132 to the regulator 116 through the third path portion 128. The lance 142 may be positioned and extend longitudinally, at least in part, within the manifold insert 112 and within the second path portion 126. As shown in FIG. 8, when the rupture disc 120 is in a ruptured state, the lance 142 may engage with at least one seal 134 (e.g., a silicon O-ring) within the manifold insert 112 to seal oxygen from passing through the manifold insert 112 around the lance 142.

In a ruptured state, the regulator 116 may be configured to regulate the pressure of the flow of oxygen from the pressurized oxygen container outlet 132 to a suitable pressure for providing oxygen to passengers of the aircraft 100 via tubing and oxygen masks. At least one seal 134 (e.g., a silicon O-ring) may be positioned between the manifold 108 and the regulator 116 to prevent leakage of gas at the connection of the manifold 108 to the regulator 116.

As will be appreciated from the above, embodiments of the inventive concepts disclosed herein may be directed to a system including a manifold assembly.

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a pressurized gas manifold, comprising:
a body, comprising:
a connector shaped to accommodate a pressurized gas container outlet;
a manifold insert connector shaped to accommodate a portion of a manifold insert; and
a regulator connector shaped to accommodate a regulator,
wherein the body includes a hollow pathway network comprising: a) a first path portion extending from a first opening positioned to receive gas from the pressurized gas container outlet and extending to a pathway junction, the first path portion including a bend, b) a second path portion extending from the pathway junction to a second opening positioned in the manifold insert connector, and c) a third path portion extending from the pathway junction to a third opening positioned in the regulator connector; and
a rupture disc positioned between the bend of the first path portion and the pathway junction, the rupture disc oriented perpendicular to the second path portion, wherein when the rupture disc is in an unruptured state, the rupture disc is configured to seal the first path portion from the second path portion and the third path portion, wherein when the rupture disc is in a ruptured state, the rupture disc is configured to allow a flow of gas from the pressurized gas container outlet to the regulator.

2. The system of claim 1, wherein the bend of the first path portion is approximately 90 degrees.

3. The system of claim 2, wherein the second path portion and the third path portion are oriented approximately orthogonal to a section of the first path portion between the first opening and the bend.

4. The system of claim 3, wherein the second path portion is between 20 and 160 degrees offset from the third path portion.

5. The system of claim 3, wherein the second path portion is approximately 45 degrees offset from the third path portion.

6. The system of claim 1, wherein a diameter of the rupture disc is less than a diameter of the pressurized gas container outlet.

7. The system of claim 1, wherein the body is composed of a copper alloy.

8. The system of claim 1, wherein the body further comprises a fill port.

9. The system of claim 1, further comprising the regulator connected to the regulator connector.

10. The system of claim 1, further comprising the manifold insert connected to the manifold insert connector.

11. The system of claim 10, further comprising an initiator connected to the manifold insert, the initiator configured to initiate a pyrotechnic charge to cause a lance to rupture the rupture disc.

12. The system of claim 1, further comprising a pressurized gas container including the pressurized gas container outlet.

13. The system of claim 12, wherein the pressurized gas container is a pressurized oxygen container.

14. The system of claim 13, wherein the system is a passenger service unit (PSU) of an aircraft.

15. An aircraft system, comprising:
a passenger service unit (PSU), comprising:
  a regulator;
  a manifold insert;
  an initiator connected to the manifold insert;
  a pressurized oxygen container including a pressurized oxygen container outlet; and
  a pressurized gas manifold, comprising:
    a body, comprising:
      a connector connected to the pressurized oxygen container outlet;
      a manifold insert connector connected to the manifold insert; and
      a regulator connector connected to the regulator,
    wherein the body includes a hollow pathway network comprising: a) a first path portion extending from a first opening positioned to receive oxygen from the pressurized oxygen container outlet and extending to a pathway junction, the first path portion including a bend, b) a second path portion extending from the pathway junction to a second opening positioned in the manifold insert connector, and c) a third path portion extending from the pathway junction to a third opening positioned in the regulator connector; and
    a rupture disc positioned between the bend of the first path portion and the pathway junction, the rupture disc oriented perpendicular to the second path portion, wherein when the rupture disc is in an unruptured state, the rupture disc is configured to seal the first path portion from the second path portion and the third path portion, wherein when the rupture disc is in a ruptured state, the rupture disc is configured to allow a flow of oxygen from the pressurized oxygen container outlet to the regulator,
  wherein the initiator is configured to initiate a pyrotechnic charge to cause a lance to rupture the rupture disc.

16. The aircraft system of claim 15, wherein the bend of the first path portion is approximately 90 degrees.

17. The aircraft system of claim 16, wherein the second path portion and the third path portion are oriented approximately orthogonal to a section of the first path portion between the first opening and the bend.

18. The aircraft system of claim 17, wherein the second path portion is between 20 and 160 degrees offset from the third path portion.

19. The aircraft system of claim 15, wherein a diameter of the rupture disc is less than a diameter of the pressurized oxygen container outlet.

* * * * *